United States Patent [19]

Thomas

[11] 4,059,669
[45] Nov. 22, 1977

[54] METHOD OF MAKING ALUMINUM PHOSPHATE

[75] Inventor: Ian M. Thomas, Temperance, Mich.

[73] Assignee: Owens-Illinois, Inc., Toledo, Ohio

[21] Appl. No.: 488,087

[22] Filed: July 12, 1974

Related U.S. Application Data

[62] Division of Ser. No. 305,342, Nov. 10, 1972, abandoned.

[51] Int. Cl.² .......................................... C01B 15/16
[52] U.S. Cl. .................................... 264/319; 264/63; 423/314
[58] Field of Search ............... 264/332, 56, 63, 319, 264/327; 423/311, 312, 313, 314, 305, 315

[56] References Cited

U.S. PATENT DOCUMENTS 3,427,174  2/1969  Miller ..................... 264/63

FOREIGN PATENT DOCUMENTS 504,835  8/1954  Canada .................. 423/305
634,837  3/1950  United Kingdom ........ 264/332

Primary Examiner—Robert F. White
Assistant Examiner—John Parrish
Attorney, Agent, or Firm—Richard D. Heberling; Edward J. Holler

[57] ABSTRACT

Aluminum phosphate is made in ultrapure form by reaction between phosphoric acid and an aluminum alkoxide. Cast articles may be made by using the liquid reaction intermediate product as a binder in sintering of particles of aluminum phospate.

4 Claims, No Drawings

METHOD OF MAKING ALUMINUM PHOSPHATE

This is a Division, of application Ser. No. 305,342, filed Nov. 10, 1972, now abandoned which is relied upon and the entire disclosure and specification of which is hereby incorporated by reference.

The present invention relates to the preparation of aluminum phosphates and more particularly, the invention relates to the production of aluminum metaphosphate, Al $(PO_3)_3$, in the form of a highly pure material.

This invention also relates to the preparation of ultra-pure aluminum metaphosphate bodies corresponding to the formula Al $(PO_3)_3$ using a liquid reaction product which is an intermediate as a binder in sintering finely divided Al $(PO_3)_3$. The uses for aluminum phosphate are known in the industry and it will be apparent that the products produced by the present invention may be employed for those purposes.

In the past, the preparation of Al $(PO_3)_3$ has been accomplished by reaction of phosphoric acid with alumina, $Al_2O_3$. The disadvantages of this conventional method of making aluminum metaphosphate is the fact that the reaction is slow and there is a chance of loss of volatile phosphorus oxides during the process. Furthermore, there is a potential for even greater loss of phosphorous during sintering of the material because of the high temperature required.

It is, accordingly, an object of the present invention to provide a method of making high purity aluminum phosphate compounds and mixtures.

It is a further object of the invention to provide a new method of making high purity aluminum metaphosphate.

Still further, it is an object of the present invention to provide a method of making a shaped article from a liquid intermediate reaction product and finely divided aluminum metaphosphate.

In attaining the aforesaid object, one feature of the present invention resides in producing high purity aluminum phosphate by mixing in selected reactive proportions phosphoric acid with an organic aluminum compound, as hereinafter defined, and ultimately recovering after heating the solid desired product.

According to a further feature of the invention, the reaction is carried out utilizing an aluminum hydrate for reaction with the phosphoric acid.

A still further feature of the present invention resides in a method for making a shaped article consisting essentially of aluminum metaphosphate by mixing in reactive proportions phosphoric acid and an organic aluminum compound, as hereinafter defined, or hydrate thereof, and forming a liquid reaction product mixture. To the liquid reaction product is then added a sufficient quantity of finely divided or ground aluminum metaphosphate to form a smooth and pourable paste which is then poured into a mold and heated to an elevated temperature to produce a dimensionally stable product.

The above and other objects, features and advantages of the present invention will become apparent from the following detailed description thereof.

As contemplated by the method of this invention, a reactable mixture is prepared based on phosphoric acid and an organic aluminum compound or an aluminum hydrate. Generally, phosphoric acid will react with the aluminum compound without heating and indeed, the reaction is usually vigorously exothermic and cooling may be necessary to properly control the reaction. The reaction product obtained is a precursor or intermediate, which in the case of Al $(PO_3)_3$ is water soluble. Sufficient water is present or added to the reaction system to produce an aqueous solution or at least a liquid which may be handled conveniently. After drying and removal of the liquid by distillation, evaporation or other suitable technique, a dry, solid material is obtained in quantitative yield. In accordance with a more detailed aspect of the invention, freshly hydrolyzed aluminum alkoxides are used which are then mixed with the phosphoric acid with heating to produce a clear, liquid, intermediate reaction product. After drying, a solid, dry material was obtained.

For the purposes of this invention, the phosphoric acid may be in the form of ortho, meta, pyro, hydro or anhydrous phosphoric acid. Any convenient or available source of phosphoric acid may be used. In general, ortho phosphoric acid is widely available and is a convenient form for use in accordance with this invention. It is usually sold in the form of an aqueous solution; e.g., 85% ortho phosphoric acid.

The aluminum compound suitable for purposes of the invention in one aspect thereof is an organic aluminum compound which is represented by the structural formula Al $(OR)_3$ wherein the "R" substituent is a straight or branched chain alkyl group containing from 1 to 20 carbon atoms, phenyl, or alkaryl group containing 7 to 12 carbon atoms. In the case of the aluminum alkoxides, the alkyl groups may be primary, secondary or tertiary alkyl groups. Suitable alkyl groups include methyl, ethyl, isopropyl, n-hexyl, sec-pentyl, sec-butyl, t-butyl, and the like. Preferably, the alkyl is a primary, secondary, or tertiary $C_2$–$C_5$ alkyl with sec-butyl (sec-$C_4H_9$) and isopropyl being particularly useful. Liquid aluminum alkoxides are most preferred because of ease of handling.

In another aspect of this invention, the aluminum compound may be a hydrolyzed derivative of one of the above organic aluminum compounds. The hydrated aluminum compounds commercially available are suitable for this purpose, particularly those of high surface area; i.e., the active aluminum hydrates.

It is not necessary to carry out the reaction in any special atmosphere and further, it is not necessary to avoid the use of water since a hydrolysis reaction may be used as an initial step to produce freshly hydrolyzed aluminum alkoxide which in turn is available for the reaction with phosphoric acid.

While in one aspect, the aluminum alkoxides are represented by the structural formula Al $(OR)_3$ wherein the OR group is an alkoxy group as defined above of 1 to 20 carbon atoms, it should be understood that depending upon the manner in which the aluminum alkoxides are made it may be more appropriate to represent them in polymeric form by the formula $[Al\ (OR)_3]_x$ where $x$ is an integer of 2 or more.

It is believed that the reaction of the phosphoric acid and the aluminum compound, whether hydrolyzed or not, may be represented by the following equations using ortho phosphoric acid as representative:

$$3H_3PO_4 + Al(OR)_3 \rightarrow Al(PO_3)_3 + 3ROH + 3H_2O$$

While the above reaction is taking place, it is believed that the following reactions may also be taking place:

$$Al(OR)_3 + 3H_2O \rightarrow Al(OH)_3 + 3ROH$$

$$Al(OH)_3 + 3H_3PO_4 \rightarrow Al(PO_3)_3 + 6H_2O$$

In the above reaction, it will be noted that the condensation reaction generally proceeds by the reaction of about one mole of the aluminum compound with about 3 moles of the acid which is orthophosphoric acid to produce the aluminum metaphosphate with liberation and condensation of water and alcohol. Preferably, aluminum alkoxides are used wherein the "R" group of the OR group represents a primary, secondary, or tertiary C-1 to C-20 alkyl group wherein the secondary alkyl groups, particularly secondary butyl, (sec-butyl) is preferred. As a result, alkanols are liberated and are ultimately evaporated or distilled off.

When preparing aluminum phosphates generally the relative proportions of the starting materials may vary widely. Also because various types of phosphoric acid and aluminum compounds may be used for purposes of the invention, it is convenient to set forth the proportions in terms of $P_2O_5$ and $Al_2O_3$. In other words, setting forth the proportions expressed as $P_2O_5$ and $Al_2O_3$ will enable a person skilled in the art to readily arrive at the suitable amount of starting material to be used in the reaction, whether the acid is ortho, pyro etc. and whether hydrated alumina or an organic aluminum compound is used. Therefore, the broad range of proportion is 5% to 85% by weight $P_2O_5$ (actually added in the form of phosphoric acid) and 15% to 95% by weight $Al_2O_3$ (actually added as an aluminum compound as defined herein).

In preparing particular aluminum phosphate such as the ortho or meta forms, the proportions will be selected to fall within the range of about 19 to 42% $Al_2O_3$ and about 81 to 58% $P_2O_5$ by weight.

Expressed in another way and with reference to a particular embodiment of the invention, the ratio of the number of moles of phosphoric acid to the number of moles of aluminum compound used in the reaction to form aluminum metaphosphate $Al(PO_3)_3$, is about 3 to 1.

Conveniently, the reaction is carried out without requiring the use of catalysts. In fact, when phosphoric acid is added slowly to the aluminum alkoxides, a vigorous exothermic reaction may take place so that it is necessary to carry out cooling in order to control the reaction to the desired degree. In the case where a freshly hydrolyzed aluminum alkoxide is employed, it is not usually necessary to cool the reaction mixture.

Aluminum metaphosphate may be produced in accordance with this invention of extremely high purity and is particularly useful for the purposes disclosed in the application of J. M. Florence and W. E. Smith, (F-12368 docket 25874) filed concurrently herewith and which is relied on in this connection. Of course, the aluminum metaphosphate and other forms of aluminum phosphate made in accordance with this invention may be used for any other purpose for which this compound has been utilized in the past or will be apparent to those skilled in the art.

When phosphoric acid is used according to the invention and for purposes of achieving close control over the course of the reaction to prevent uncontrolled reaction, it is preferable to add the phosphoric acid to the aluminum compound with stirring and preferably with cooling. Alternatively, the aluminum compound may be added to the acid. A slow addition is preferred so as to maintain the reaction at a sufficient rate and thereby prevent an explosive reaction from occurring. Generally, depending upon the rate of addition, a vigorous exothermic reaction takes place and if insufficient water is present, a solid material will precipitate. Water may be added to the reaction mixture after the phosphoric acid and the aluminum compounds are mixed and the mixture can then be heated to the boiling point or under conditions of reflux. Depending upon whether the liberated ROH product is water soluble, a single phase or a two-phase liquid will eventually develop. Generally, the addition of water and the heating process takes place over a period of about 10 minutes to 10 hours or more depending, of course, on the materials liberated. In the development of the two-phase clear liquid, the upper layer which consists of the alkanol hydrolysis product may be removed by evaporation, by distillation, vacuum methods and the like. Similarly, in a single phase system, the alkanol may be removed in the same manner.

After removal of the ROH product, the remaining liquid material is viscous or syrupy and contains the aluminum metaphosphate precursor. The viscous intermediate reaction product is then placed in an oven and dried to obtain a hard, solid material. Generally, the drying temperature of at least 100° C. for a sufficient period of time, generally 30 minutes to several hours followed by baking at a temperature of 300° C. to 600° C., more generally up to 500° C., for 30 minutes to 48 hours is sufficient to produce a hard, solid product in substantially quantitative yield. The product is white and may be characterized as lumpy. It should be pointed out that the particular temperature and duration of heating may be varied considerably as will be apparent to those skilled in the art.

In the embodiment of the invention wherein freshly hydrolyzed aluminum alkoxides are used, the invention is carried out by hydrolyzing the organic aluminum compound; e.g., alkoxide with water to form the corresponding hydrate or hydrated derivative thereof. A sufficient amount of water is mixed with the organic aluminum compound and then the aqueous suspension is heated until at least some of the liberated alkanol is boiled off. The heating may be continued until all the ROH by-product is boiled off. Alternatively, the remainder of the ROH may be removed after addition and reaction of the acid. At this point, the phosphoric acid may be added and the boiling continued to remove any remaining ROH by-product, wherein R is defined as above. Ultimately, a clear viscous liquid product will be obtained and this may again be recovered and dried at a temperature of at least 100° C., preferably 110° C. for a period of time ranging from 30 minutes up to 48 hours and then at a higher temperature; e.g., 300° C. to 600° C. for 30 minutes to 48 hours. The ultimate product obtained thereby is a hard, white, lumpy solid obtained in quantitative yield.

The following examples are intended to illustrate this invention:

EXAMPLE 1

Reaction of phosphoric acid with aluminum alkoxides

Orthophosphoric acid (85% aqueous solution) (173 g: 1.50 mole) was added slowly to Al(OBu)$_3$ (123 g: 0.50 mole) with stirring and cooling. A vigorous exothermic reaction took place and a solid was deposited. Water (50 ml) was added after the addition and the mixture then heated to boiling in an open beaker. A two-phase clear liquid mixture was obtained within thirty minutes and the upper layer (probably sec-butanol) was removed by evaporation over the next two hours.

The syrupy liquid residue was then placed in an oven at 110° C. over a weekend and the resulting hard solid then heated slowly to 500° C. and held at this temperature for one hour.

X-ray analysis showed that the material at this stage was substantially aluminum metaphosphate.

A white, hard, lumpy solid product was obtained in 96% yield.

EXAMPLE 2

Reaction of phosphoric acid with hydrolyzed aluminum alkoxides

Al(OBu)$_3$ (93.2 g: 0.379 mole) was added to water (1000 g) with stirring and the mixture then heated to the boiling point in an open beaker. When all the liberated sec-butanol had boiled off, phosphoric acid (131.2 g: 1.14 mole) was added and boiling continued. A clear viscous liquid product was eventually obtained and this was heated in an oven at 110° C. for twenty-four hours, 160° C. for twenty-four hours, and then slowly to 350° C. and held for sixteen hours. A hard, white, lumpy solid product was obtained in quantitative yield.

X-ray analysis showed that the material at this stage was substantially aluminum metaphosphate.

EXAMPLE 3

Preparation of P$_2$O$_5$ (74.6%) — Al$_2$O$_3$ (25.4%) mixture

Water (1000 ml) was added slowly to aluminum sec-butoxide (1225 g) and the resulting mixture evaporated to dryness under vacuum (1326 g).

Orthophosphoric acid (1180 g of 86% aqueous solution) was then added and the mixture stirred and heated until a smooth homogeneous colloidal sol was obtained. This was heated at 110° C. for 3 hours, 160° C. for 19 hours, 200° C. for 2 hours, 300° C. for 21 hours and finally 400° C. for 4½ hours.

A white, hard, lumpy solid product was obtained in quantitative yield.

In another important aspect of the invention, shaped articles can be formed by a casting technique which utilizes the liquid intermediate reaction product as an excellent binder for sintering finely divided or ground aluminum metaphosphate. In carrying out this aspect of the invention, the liquid intermediate reaction product is made by mixing in reactive proportions the phosphoric acid and the aluminum compound. The latter can be the organic aluminum compound or hydrated derivative thereof as defined hereinabove. The reaction between the acid and the aluminum compound produces the liquid intermediate product. To this liquid is then added particulate aluminum metaphosphate, previously prepared, in sufficient amount to produce a casting slip of a smooth, pourable paste consistency.

This paste is then poured into a suitable shape, mold or form, dried under ambient conditions and then heated slowly to an elevated temperature to drive off volatiles. (Representative temperatures are in the range of 300° C. to 600° C.) Ultimately a dimensionally stable, strong, hard casting is obtained. The precise technique of heating to dry and volatilize the liquid or solvent and of obtaining the final dry, solid product can be varied considerably as will be apparent to persons skilled in the art.

The following example is illustrative of this aspect of the invention:

EXAMPLE 4

The product from Example 2 in the amount of 100 grams was ground in a mortar with a clear viscous intermediate liquid reaction product produced by reacting about 3 moles orthophosphoric acid with 1 mole aluminum sec-butoxide. A smooth pourable paste was obtained which was then poured into three polyethylene trays, approximately 3 × inches in dimension. This mixture was permitted to dry in air overnight. The samples were then transferred to a draught oven at 60° C. for five days. After this time, the samples were hard and intact. The polyethylene trays were then removed and the samples heated slowly to 500° C. and held overnight. Smooth, hard and strong slabs of Al(PO$_3$)$_3$ material were obtained and these remained stable and unchanged after exposure to air for a week and even when immersed in water. Estimated density was approximately 80% of theoretical and they were slightly porous.

While the process has been described with reference to the use of phosphoric acid, it is to be noted that phosphorous acids may also be used. Ortho, pyro, hydro and meta phosphorous acids are contemplated in this connection.

I claim:

1. A method for making a shaped article consisting essentially of aluminum metaphosphate comprising mixing in reactive proportions a phosphoric acid or a phosphorous acid with
   1. an organic aluminum compound represented by the structural formula:

   Al(OR)$_3$ wherein R is a member selected from the group consisting of straight and branched chain alkyl groups containing from 1 to 20 carbon atoms, phenyl and alkaryl groups containing from 7 to 12 carbon atoms, or
   2. the hydrolysis product of Al(OR)$_3$ wherein R is defined above, forming a clear, liquid reaction product mixture, mixing the liquid reaction product mixture with dry finely divided aluminum metaphosphate until a smooth, pourable paste is obtained, pouring the paste into a mold to obtain a molded product, thereafter heating the molded product to a sufficiently elevated temperature of at least 100° C. for a sufficient period of time to obtain a dimensionally stable article consisting essentially of aluminum metaphosphate.

2. The method according to claim 1 wherein the elevated temperature of heating the molded product ranges up to about 600° C.

3. The method according to claim 1 wherein after the paste is poured into a mold, it is dried at ambient conditions and heated slowly to temperatures in the range of 300° C. to 600° C. for a period of time of 1 hour to 48 hours.

4. A method for making a shaped article consisting essentially of aluminum metaphosphate comprising mixing phosphoric acid or a phosphorous acid with
   1. an organic aluminum compound represented by the structural formula:

   Al(OR)$_3$ wherein R is a member selected from the group consisting of straight and branched chain alkyl groups containing from 1 to 20 carbon atoms, phenyl and alkaryl groups containing from 7 to 12 carbon atoms, or 2. the hydrolysis product of Al(OR)$_3$ wherein R is defined above, forming a clear, liquid reaction product mixture, mixing the liquid reaction product mixture with dry finely divided aluminum metaphosphate until a smooth, pourable paste is obtained, pouring the paste into a mold to obtain a molded product, thereafter heating the molded product to a sufficiently elevated temperature of at least 100° C for a sufficient period of time to obtain a dimensionally stable article consisting essentially of aluminum metaphosphate.

* * * * *